US009228653B2

(12) United States Patent
Botez

(10) Patent No.: US 9,228,653 B2
(45) Date of Patent: Jan. 5, 2016

(54) IDLER SPROCKET LUBRICATION ASSEMBLY AND METHOD

(71) Applicant: Schaeffler Technologies GmbH & Co. KG, Herzogenaurach (DE)

(72) Inventor: Lucian Botez, Novi, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/450,844

(22) Filed: Aug. 4, 2014

(65) Prior Publication Data

US 2015/0045163 A1  Feb. 12, 2015

Related U.S. Application Data

(60) Provisional application No. 61/864,160, filed on Aug. 9, 2013.

(51) Int. Cl.
*F16H 57/04* (2010.01)
*F16H 7/06* (2006.01)

(52) U.S. Cl.
CPC ............... *F16H 57/043* (2013.01); *F16H 7/06* (2013.01); *F16H 57/0471* (2013.01)

(58) Field of Classification Search
CPC ............. F16H 57/0482; F16H 57/043; F16H 57/0434; Y10T 74/19991; F16C 17/04
USPC ............................................ 474/91; 184/6.12
See application file for complete search history.

(56) References Cited

U.S. PATENT DOCUMENTS

| | | | | |
|---|---|---|---|---|
| 1,700,856 A * | 2/1929 | Schein | .................... | F16C 17/04 384/368 |
| 2,560,233 A * | 7/1951 | Maier | ...................... | F16H 9/24 184/6.12 |
| 2,681,126 A * | 6/1954 | Searls | ................ | F16H 57/0434 184/6.12 |
| 3,213,703 A * | 10/1965 | Fitzgerald | ............... | F16H 57/05 198/834 |
| 3,316,035 A * | 4/1967 | Zuber | .................... | F16C 21/00 384/127 |
| 3,528,526 A * | 9/1970 | Resener | ................... | F16D 3/54 184/15.2 |
| 3,574,423 A * | 4/1971 | Thomson | ................. | F16N 9/02 384/473 |
| 3,805,631 A * | 4/1974 | Kerklies | ................. | B65G 23/00 198/834 |
| 4,321,750 A * | 3/1982 | Sugihara | ................. | B27B 17/12 30/384 |
| 4,355,988 A * | 10/1982 | Klaus | ..................... | B62D 55/15 305/119 |
| 4,752,279 A * | 6/1988 | Ogino | ..................... | F16H 57/05 474/91 |
| 4,772,188 A * | 9/1988 | Kimura | .............. | F04C 29/0021 384/123 |
| 4,950,213 A * | 8/1990 | Morisawa | ................. | F16H 3/60 184/6.12 |

(Continued)

FOREIGN PATENT DOCUMENTS

EP        0374802 A1    6/1990
EP        2177721 A1    4/2010

*Primary Examiner* — Henry Liu
(74) *Attorney, Agent, or Firm* — Simpson & Simpson, PLLC

(57) ABSTRACT

The invention presented is a chain drive sprocket assembly designed to capture lubricating oil from the engine sump or case and distribute the oil throughout the assembly including over the bearings. The invention provides a unique accumulator channel to capture dripping and splashing oil and exit ports with reduced pressure that enable the oil to be drawn through the bearing space and out the assembly, providing for continuous circulation of oil through the assembly.

17 Claims, 3 Drawing Sheets

(56) References Cited

U.S. PATENT DOCUMENTS

| | | | | |
|---|---|---|---|---|
| 5,443,139 | A * | 8/1995 | Scott | B62J 31/00 184/15.1 |
| 5,467,668 | A * | 11/1995 | Kameda | B60K 17/06 180/297 |
| 5,542,316 | A * | 8/1996 | Spooner | F16H 48/147 184/6.12 |
| 6,474,444 | B1 * | 11/2002 | Mochizuki | F16C 19/386 184/6.12 |
| 6,843,348 | B2 * | 1/2005 | Wittkopp | F16H 63/3026 184/6.12 |
| 7,065,954 | B2 * | 6/2006 | Labala | F01D 25/18 184/11.2 |
| 7,225,897 | B2 * | 6/2007 | Hori | F01M 1/12 184/6.12 |
| 7,399,253 | B2 * | 7/2008 | Kim | F16H 57/0482 184/6.12 |
| 7,673,539 | B2 * | 3/2010 | Knox | F16H 57/023 184/11.1 |
| 7,694,780 | B2 * | 4/2010 | Beels van Heemstede | F16H 57/0434 184/26 |
| 8,062,165 | B2 * | 11/2011 | Chen | F16C 17/04 475/331 |
| 2004/0094364 | A1 * | 5/2004 | Hammill | F16H 57/0482 184/6.12 |
| 2004/0204251 | A1 * | 10/2004 | Menosky | F16D 3/41 464/132 |
| 2006/0054407 | A1 * | 3/2006 | Wirth | F16H 57/05 184/6.12 |
| 2007/0160314 | A1 * | 7/2007 | Richie | F16C 17/065 384/121 |
| 2009/0190870 | A1 * | 7/2009 | Chen | F16C 17/04 384/420 |
| 2012/0058853 | A1 * | 3/2012 | Schoon | B60K 1/02 475/5 |

* cited by examiner

IDLER SPROCKET LUBRICATION ASSEMBLY AND METHOD

CROSS REFERENCE TO RELATED APPLICATIONS

This application claims the benefit under 35 U.S.C. §119(e) of U.S. Provisional Patent Application No. 61/864,160, filed Aug. 9, 2013.

FIELD OF THE INVENTION

The present invention relates to chain drive sprocket assemblies, more specifically to the lubrication of chain drive sprocket assemblies, and still more specifically to the continuous lubrication of chain sprocket assemblies and their bearings.

BACKGROUND OF THE INVENTION

Chain drives are used in association with vehicle engines to drive such ancillary components as valve lifters. Often, chain drive assemblies are designed to capture dripping and/or splashing oil from the engine oil sump for lubrication of those assemblies. However, where splash or drips from the engine sump are insufficient and/or where bearings are too far away from the engine, the bearings may be deprived of adequate lubricating oil. In addition, the structure of the chain drive assembly or the presence of assembly components such as seals or assembly retention features may block oil from reaching the bearings.

Pump systems, either separate pumps used with the chain drive assemblies or those diverting oil from the engine pump to the chain drive assembly may be used to provide the necessary quantity of oil to the assembly. However, these systems add to the overall cost of the vehicle and can increase the complexity of the design, e.g. in fitting additional components into the engine compartment.

Thus, there is a need in the field to provide an inexpensive method and apparatus to adequately lubricate chain drive sprocket assemblies used with engines in vehicles.

SUMMARY OF THE INVENTION

The invention broadly comprises a chain drive sprocket assembly for an engine comprising a chain drive sprocket shell having a first sprocket end and a second sprocket end and including at least one idler chain sprocket, an idler shaft having a first shaft end, a second shaft end, and a central bore extending a longitudinal length of the idler shaft, a plurality of bearings positioned in a bearing space between the chain drive sprocket shell and the idler shaft, a washer functionally attached to the first end of the idler shaft, an accumulator channel shaped into the washer and, a receiving orifice formed in the idler shaft and aligned with the accumulator channel, wherein lubricating oil from the engine accumulates onto the accumulator channel and flows into the receiving orifice.

In a preferred embodiment, accumulator channel is inclined toward the receiving orifice and a plurality of exit grooves are positioned at the first and second ends of the chain drive sprocket shell.

One object of the invention is to provide a structure and method for lubricating the chain sprocket assembly when the bearings are axially displaced from the engine sump.

A second object of the invention is to direct a flow of lubricating oil to the bearings when oil splash from the engine sump is insufficient.

A third object of the invention is to supply a device to enable the discharge of lubricating oil from a chain sprocket assembly under pressure.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended drawings and claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention as claimed Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
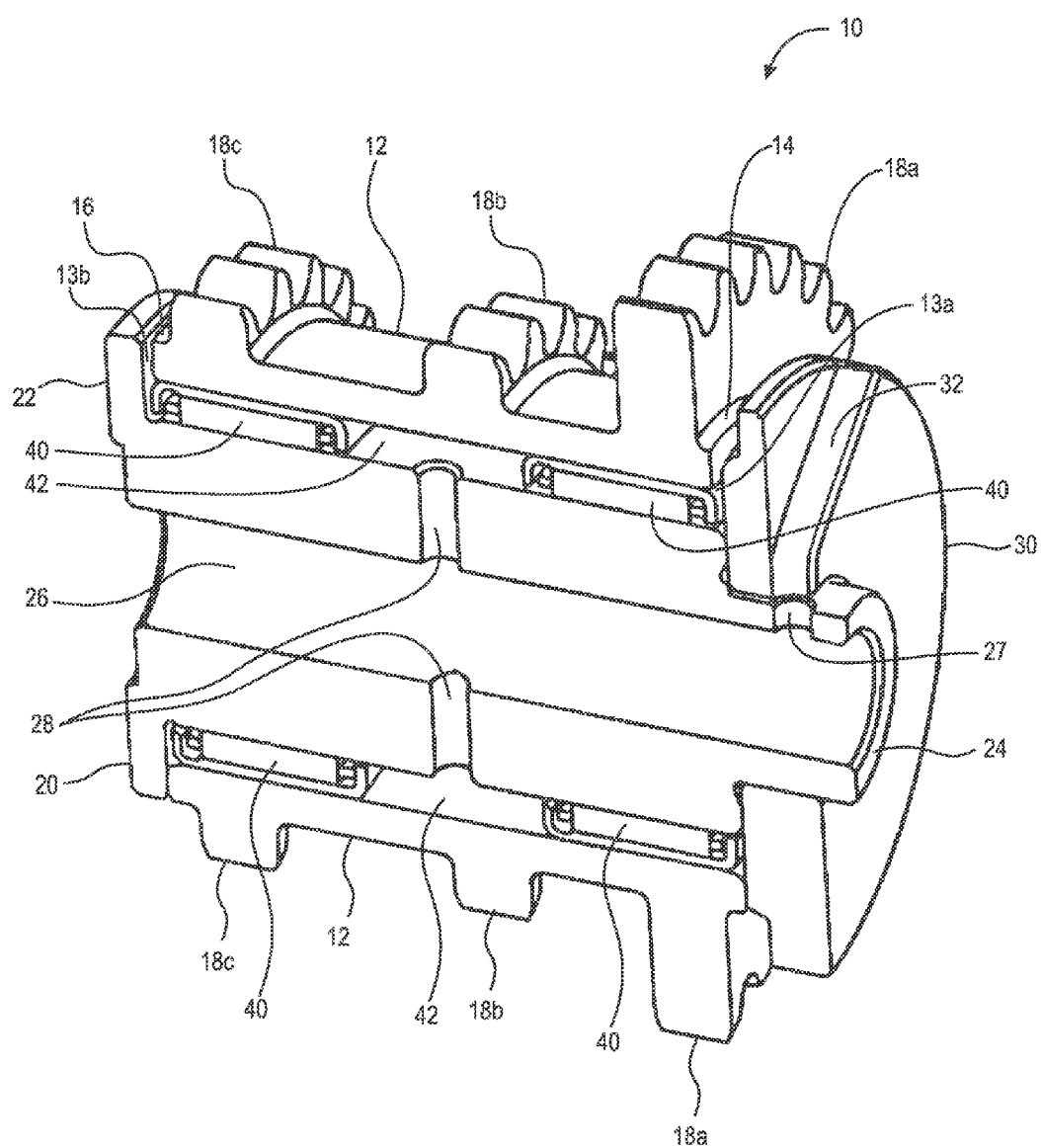
FIG. 1 is a cross section view of the chain sprocket assembly of the present invention.

Adverting to the drawings, FIG. 1 is a cross section view of chain sprocket assembly 10 ("assembly 10") of the present invention. Assembly 10 includes at least chain sprocket shell 12 ("sprocket shell 12"), idler shaft 20, and washer 30. Sprocket shell 12 includes first sprocket end 14, second sprocket end 16, and at least one chain sprocket. In the embodiment shown, sprocket shell 12 includes three chain sprockets 18a, 18b, and 18c. Sprocket shell 12 also includes exit grooves 13a and 13b at first sprocket end 14 and second sprocket end 16, respectively.

Chain drive sprocket shell 12 is seen wrapped around idler shaft 20. Put another way, idler shaft 20 is nested inside sprocket shell 12, but with second idler end 22 axially external to second sprocket end 16. By axially external is meant that second idler end 22 at least partially covers second sprocket end 16. Exit grooves 13a and 13b may be formed by both first sprocket end 14 and second sprocket end 16. First idler end 24 extends beyond first sprocket end 14. Central bore 26 extends the longitudinal length of idler shaft 20. At least one transverse groove 28 extends through the sides of a middle portion of the longitudinal length of idler shaft 20. By middle is meant a portion more proximate to the midpoint of the longitudinal length of idler shaft 20 than to either first idler end 24 or second idler end 22.

Figure 3:
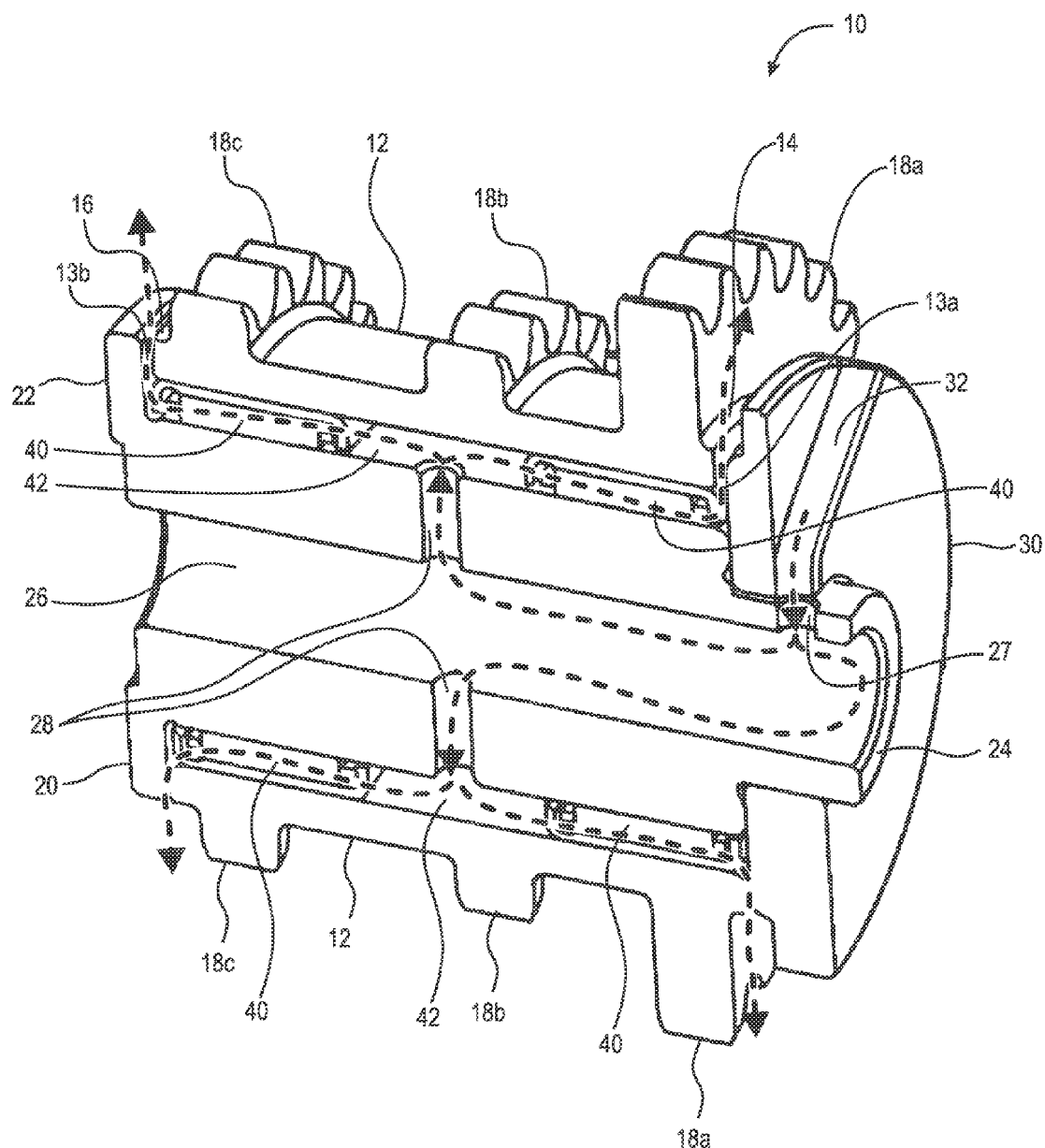

Washer 30 is functionally attached to first idler end 24. By functional attachment is meant that washer 30 is attached to first idler end 24 and this attachment allows washer 30 to function as described below. In the embodiment shown, washer 30 is fitted over first idler end 24. Persons of skill in the art will recognize that other forms of attachment may be used, such as a flange-clamp arrangement or welding. Washer 30 includes accumulator channel 32 formed into washer 30. In the embodiment shown in FIG. 1, the inner surface of washer 30 (not seen in FIG. 1) is adjacent to first sprocket end 14 and optionally may form exit ports 13a and 13b as seen in FIGS. 1 and 3. Receiving orifice 27 formed proximate to first idler end 24 is aligned with accumulator channel 32. Preferably, accumulator channel 32 is formed into an inclined angle toward receiving orifice 27. Washer 30 may be part of the connection of the shaft in central bore 26 to the vehicle engine (not shown). Persons of skill in the art will recognize that accumulator channel 32 may be formed from the engine block or partially from washer 30 and the engine block. Bearings 40 are press fit into bearing space 42 between idler shaft 20 and sprocket shell 12.

FIG. 3 is a cross section view of chain sprocket assembly 10 depicting the flow of lubricating oil through assembly 10. Oil flow is shown by the arrows. During operation, sprocket shell 12 rotates as chains operatively attached to sprockets 18a, 18b, and 18c pull on the sprockets driving shell 12 into rotational movement around stationary idler shaft 20. Washer 30 also remains stationary. Oil accumulates in stationary accumulator channel 32 as drippings from the engine block, engine sump, or other sources. The oil then passes through accumulator channel 32 through receiving orifice 27 into idler shaft 20 along central bore 26.

From central bore 26, lubricating oil passes through transverse groove(s) 28 into bearing space 42. The constant flow forces the oil over bearings 40 enabling them to be sufficiently lubricated even if axially distant from the engine or engine sump. By axially distant or axially displaced is meant that bearings 40 positioned along the central axis of central bore 26 at a distance from the position of the engine or engine sump along the same central axis. After passing over and lubricating bearings 40, the oil travels through bearing space 42 downstream of bearings 40 to exit ports 13a and 13b at first sprocket end 14 and second sprocket end 16, respectively.

Figure 2:
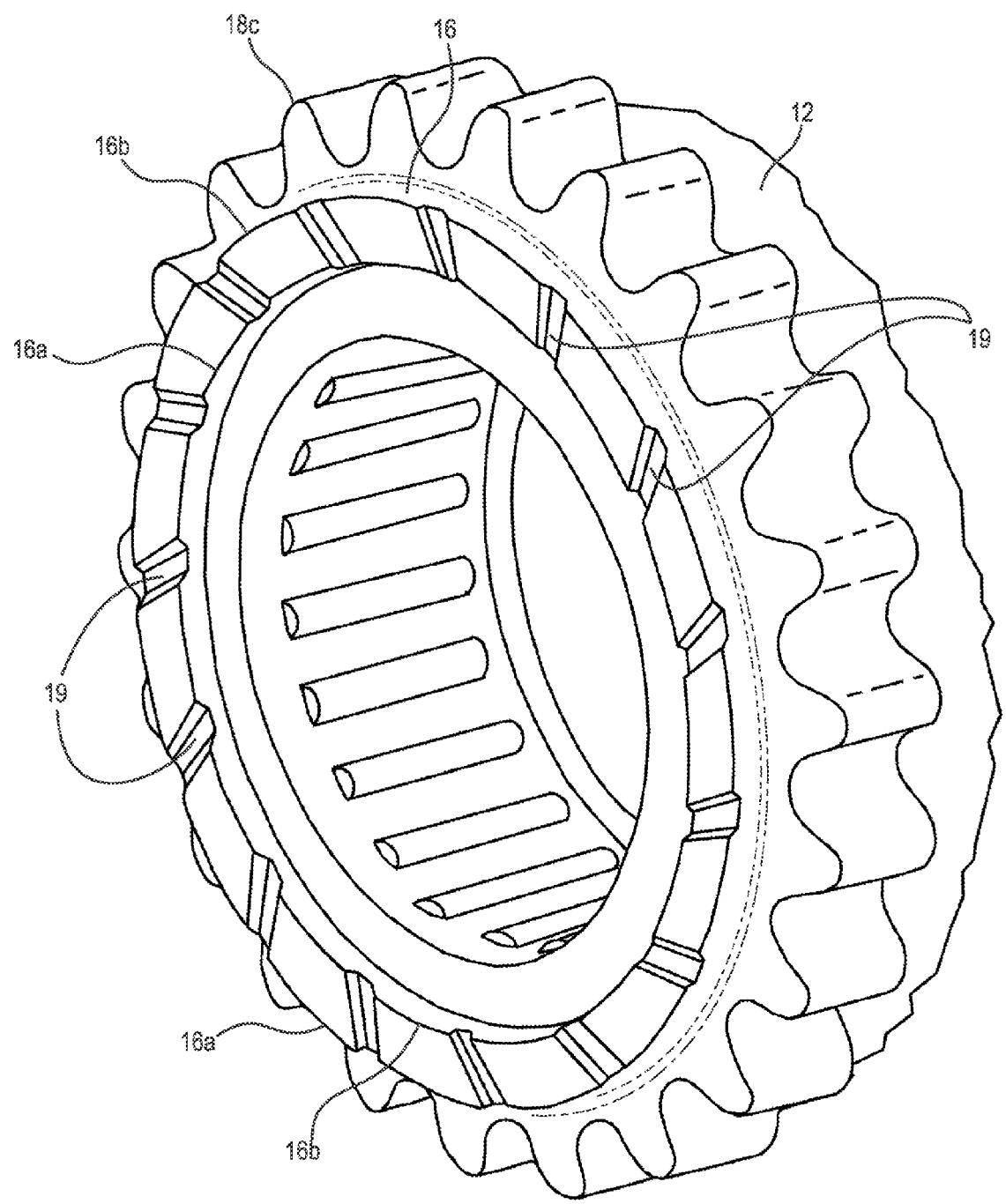
FIG. 2 is a side perspective view of the one end of the chain sprocket shell showing angular radial exit grooves; and, FIG. 3 is a cross section view of the chain sprocket assembly depicting the flow of lubricating oil through the assembly.

FIG. 2 is a side perspective view of second sprocket end 16. Visible are discharge grooves 19 extending outward at an angle from the inner edge 16a to outer edge 16b of second sprocket edge 16. During rotation of sprocket shell 12, thereby rotating discharge grooves 19, a pressure differential is created between the relatively high pressure of bearing space 42 and the outer periphery of discharge grooves 19 to draw the lubricating oil out of bearing space 42 through exit grooves 19 by way of exit port 13b. The pressure differential is created by the high relative velocity of the air over sprocket assembly 12 at the periphery of the radial discharge grooves 19 and is enhanced by the close fit of second idler end 22 to second sprocket end 16 to form a tight fit. This allows the pressure difference to be created as sprocket shell 12 rotates. Similar angular radial grooves 19 are preferably formed into first sprocket end 14 using the close fit with washer 30 to create a similar pressure difference. Again, discharge grooves 19 in first sprocket end 14 are oriented in an angular radial direction between an inner edge and an outer edge and receive oil from exit port 13a. In this way, lubricating oil that lubricates bearings 40 is constantly replenished.

It can be seen that the invention described above provides the advantage of creating a simple and cost effective lubrication method for the bearings of chain drive sprocket assemblies. In addition, persons of skill in the art will recognize that the system can be applied to different types of bearings such as ball bearings or tapered bearings and other drives such as belt drives or gear drives.

Thus it is seen that the objects of the invention are efficiently obtained, although changes and modifications to the invention should be readily apparent to those having ordinary skill in the art, which changes would not depart from the spirit and scope of the invention as claimed.

What is claimed is:

1. A chain drive sprocket assembly for an engine comprising:
   a chain drive sprocket shell having a first sprocket end and a second sprocket end and including at least one idler chain sprocket;
   an idler shaft having a first shaft end, a second shaft end, and a central bore extending a longitudinal length of said idler shaft;
   a plurality of bearings positioned in a bearing space between said chain drive sprocket shell and said idler shaft;
   a washer functionally attached to said first end of said idler shaft:
   an accumulator channel shaped into said washer;
   a receiving orifice formed in said idler shaft and aligned with said accumulator channel;
   wherein lubricating oil from said engine accumulates onto said accumulator channel and flows into said receiving orifice.

2. The chain drive sprocket assembly for an engine as recited in claim 1, wherein said lubricating oil flows from said from said receiving orifice into said central bore.

3. The chain drive sprocket assembly for an engine as recited in claim 1, wherein said accumulator channel is formed on a block of said engine.

4. The chain drive sprocket assembly for an engine as recited in claim 1, wherein said accumulator channel is formed partly on said washer and partly on a block of said engine.

5. The chain drive sprocket assembly for an engine as recited in claim 1, wherein said accumulator channel is inclined toward said receiving orifice.

6. The chain drive sprocket assembly for an engine as recited in claim 1, further comprising at least one transverse groove in a middle of said longitudinal length of said idler shaft, wherein said lubricating oil exits said central bore through said at least one transverse groove into said bearing space.

7. The chain drive sprocket assembly for an engine as recited in claim 1, further comprising at least a pair of exit ports, each of said pair of exit ports positioned at said first sprocket end and said second sprocket end.

8. The chain drive sprocket assembly for an engine as recited in claim 7, said chain drive sprocket assembly further comprising a plurality of discharge grooves formed in said first sprocket end wherein said discharge grooves extend radially outward from an inner first sprocket end edge to an outer first sprocket end edge and wherein said exit ports receive oil from at least one of said pair of exit ports and discharge said oil to outside said assembly.

9. The chain drive sprocket assembly for an engine as recited in claim 7, said chain drive sprocket assembly further comprising a plurality of discharge grooves formed in said second sprocket end wherein said discharge grooves extend radially outward from an inner second sprocket end edge to an outer second sprocket end edge and wherein said exit grooves receive oil from at least one of said pair of exit ports and discharge said oil to outside said assembly.

10. The chain drive sprocket assembly for an engine as recited in claim 7, said chain drive sprocket assembly further comprising a pair of pluralities of discharge grooves formed in said first sprocket end and said second sprocket end wherein said discharge grooves extend radially outward from an inner first sprocket end edge to an outer first sprocket end edge and an inner second sprocket end edge to an outer second sprocket end edge, respectively, and wherein said exit ports receive oil from one of said pair of exit ports and discharge said oil to outside said assembly.

11. A chain drive sprocket assembly for an engine comprising:
    a chain drive sprocket shell having a first sprocket end and a second sprocket end and including at least one idler chain sprocket;
    an idler shaft having a first shaft end, a second shaft end, and a central bore extending a longitudinal length of said idler shaft;
    a plurality of bearings positioned in a bearing space between said chain drive sprocket shell and said idler shaft;
    a washer functionally attached to said first end of said idler shaft;
    an accumulator channel shaped into said washer,
    a receiving orifice formed in said idler shaft and aligned with said accumulator channel;
    wherein said accumulator channel is inclined toward said receiving orifice;
    at least one transverse groove in a middle of said longitudinal length of said idler shaft, wherein said lubricating oil exits said central bore through said at least one transverse groove into said bearing space;
    at least a pair of exit ports, each of said pair of exit ports positioned at said first sprocket end and said second sprocket end; and,
    a plurality of exit grooves;
    wherein lubricating oil is delivered from said engine onto said accumulator channel and flows into said receiving orifice.

12. The chain drive sprocket assembly for an engine as recited in claim 11, wherein said plurality of discharge grooves is formed in said first sprocket end and wherein said discharge grooves extend radially outward from an inner first sprocket end edge to an outer first sprocket end edge and wherein said exit grooves receive oil from at least one of said pair of exit ports and discharge said oil to outside said assembly.

13. The chain drive sprocket assembly for an engine as recited in claim 11, wherein said plurality of exit grooves is formed in said second sprocket end wherein and wherein said discharge grooves extend radially outward from an inner second sprocket end edge to an outer second sprocket end edge and wherein said exit grooves receive oil from at least one of said pair of exit ports and discharge said oil to outside said assembly.

14. The chain drive sprocket assembly for an engine as recited in claim 11, wherein said plurality of exit grooves is formed in said first sprocket end and a second plurality of exit grooves is formed in said second sprocket end and wherein said discharge grooves extend radially outward from an inner first sprocket end edge and an outer first sprocket end edge and an inner second sprocket end edge to an outer second sprocket end edge, respectively, and wherein said exit grooves receive oil from one of said pair of exit ports and discharge said oil to outside said assembly.

15. The chain drive sprocket assembly for an engine as recited in claim 11, wherein said accumulator channel is formed on a block of said engine.

16. The chain drive sprocket assembly for an engine as recited in claim 11, wherein said accumulator channel is formed partly on said washer and partly on a block of said engine.

17. The chain drive sprocket assembly for an engine as recited in claim 11, wherein said accumulator channel is inclined toward said receiving orifice.

* * * * *